Aug. 16, 1927.

S. FREILINO 1,638,991

HOUSEHOLD FOOD CUTTER

Filed Feb. 19, 1926

INVENTOR
Secondo Freilino
BY
Vernon E. Hodges
his ATTORNEY

Aug. 16, 1927.

S. FREILINO 1,638,991

HOUSEHOLD FOOD CUTTER

Filed Feb. 19, 1926

INVENTOR
Secondo Freilino
BY Vernon E. Hodges
his ATTORNEY

Aug. 16, 1927.

S. FREILINO 1,638,991

HOUSEHOLD FOOD CUTTER

Filed Feb. 19, 1926    3 Sheets-Sheet 3

INVENTOR
Secondo Freilino
BY
his ATTORNEY

Patented Aug. 16, 1927.

1,638,991

UNITED STATES PATENT OFFICE.

SECONDO FREILINO, OF LEECHBURG, PENNSYLVANIA.

HOUSEHOLD FOOD CUTTER.

Application filed February 19, 1926. Serial No. 89,374.

This invention relates to an improvement in household food cutters.

The object of the invention is to provide a food cutter for grinding, cutting or slicing various kinds of foods, vegetables, etc., and it may be used equally well in restaurants or hotels as in a private home.

A further object of the invention is to provide such a food cutter with suitable covering means in order to keep the cutter itself perfectly clean and free of all dust or dirt which might accumulate on the cutting surface while the device is not in operation.

With these objects in view, the invention includes one or more cutting disks, each of which is carried by a dish-shaped support mounted upon a driving shaft, which shaft extends to and abuts against the center of the cutting disk in order to support the same through the center. A hopper is provided in front of the cutting disk in order to feed the food thereto and, after being cut by the disk, it passes through the same and into the dish support where it drops through openings in the side of the same into any suitable receptacle, below. The outer end of the main drive shaft may be provided with any suitable household appliances, such as a potato peeler, whetstone, etc., all of which are rotatable by a common driving motor for the main drive shaft.

A peculiarly constructed feeding device is provided with flutes and lowered into the hopper in order to direct larger articles, such as potatoes, against the cutting knives.

Figure 1:
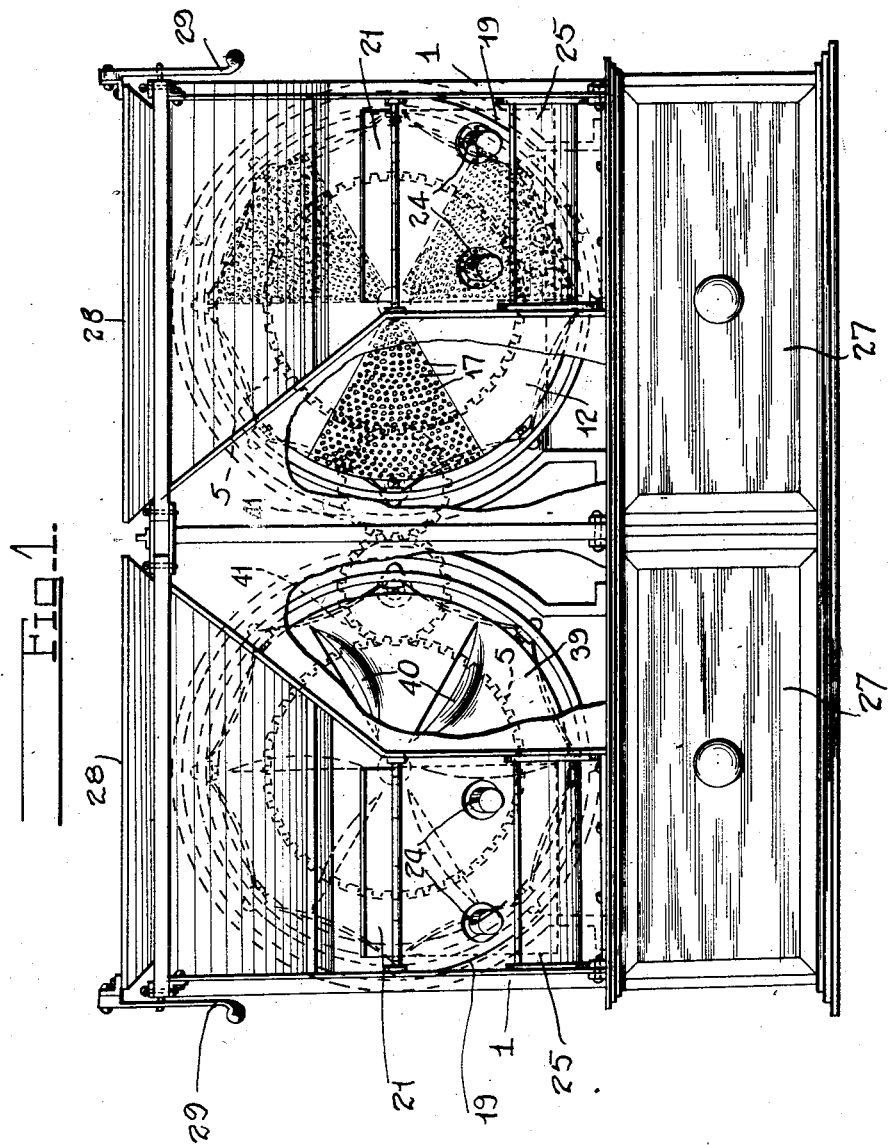
Fig. 1 is a front elevation of the invention, with parts broken away to show the interior thereof and the cutting disks.

In the drawings, number 1 indicates the framework of the machine, which has supports 2 thereon for supporting the driving motor 3 for the machine. This driving motor has a pinion 4 driven thereby which meshes with and drives a main gear 5, fixed on the main drive shaft 6. The main drive shaft 6 is mounted in a main bearing 7, supported upon the frame 1 and at the opposite ends of this main bearing 7 are auxiliary bearings 8, which serve to prevent the burning out of the bearing 7.

Figure 2:
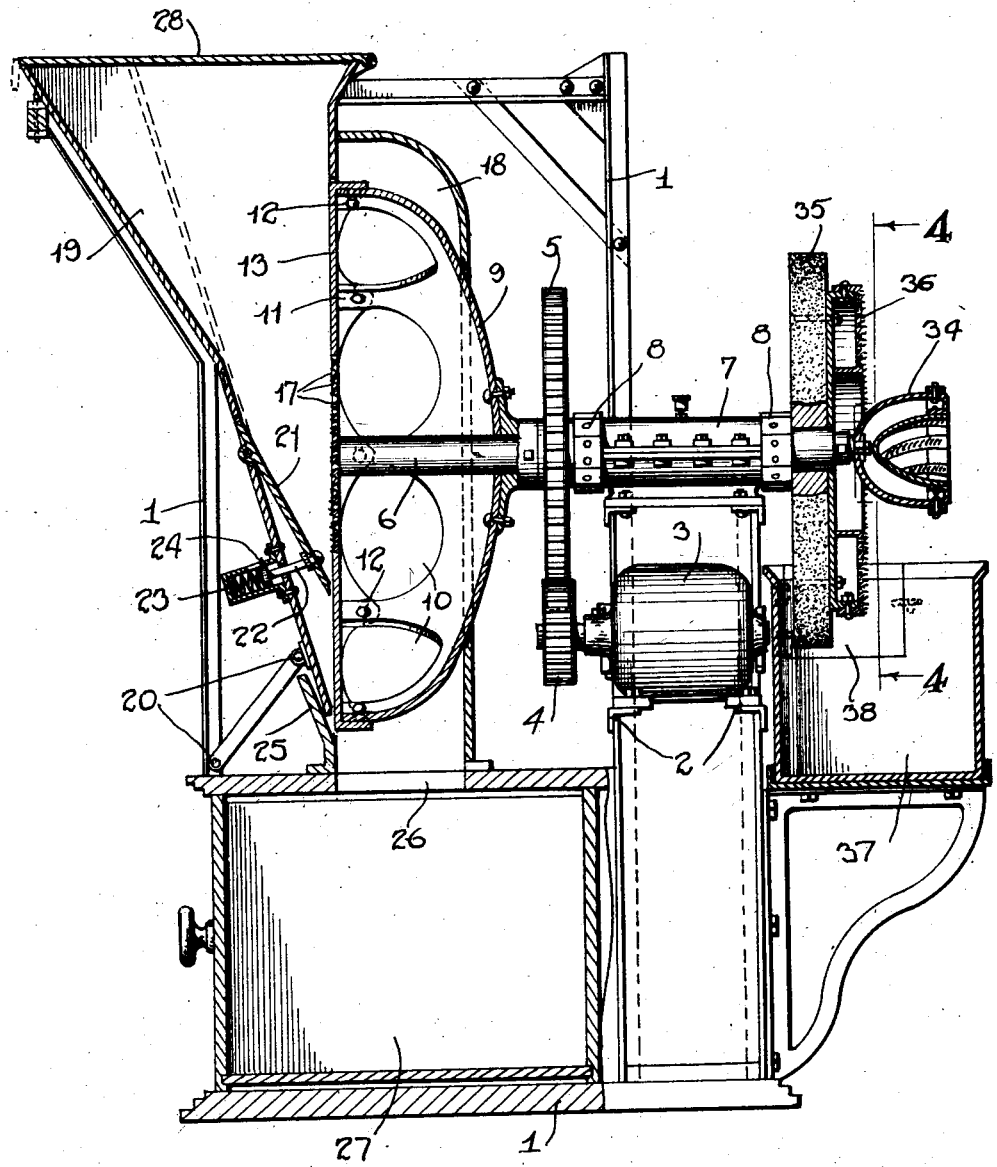
Fig. 2 is a vertical section through one side of the food cutter.
Figure 3:
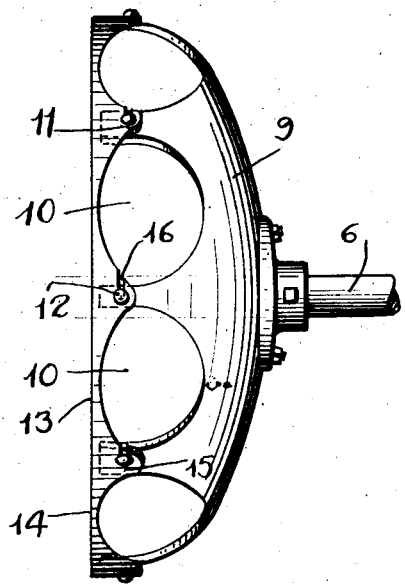
Fig. 3 is a side elevation of the cutting disk and dish support.
Figure 4:
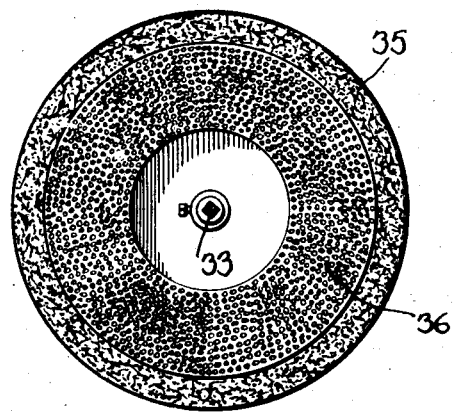
Fig. 4 is a vertical section on the line 4—4 of Fig. 2.

Fixed upon the main drive shaft 6 is a dish-shaped support 9, shown in Figs. 2 and 3, which has a plurality of openings 10 therein and with a plurality of lugs 11, which carry pins 12 projecting outwardly from the support 9. A cutting disk 13 has the outer edge thereof bent outwardly to form a flange 14 from which lugs 15 extend outwardly overlapping the projections 11 on the support 9.

As shown in Fig. 3, the lugs 15 are provided with notches 16 therein for receiving the pins 12 for removably carrying the disk from the support 9. It will be noted that these notches 16 are formed in the opposite side of the lugs 15 from the direction in which the support 9 and disk 13 are turning, so that as long as these are rotating they will tend to hold the disk tighter in its position upon the support, while, yet, permitting of the disk being given a slight backward turn in order to allow the removable of the same.

The cutting disk 13 is provided with a plurality of alternately arranged perforated and non-perforated sections, as shown in Fig. 1, the perforated sections being formed by small punched holes 17 therein.

It will be noted, by referring to Fig. 2, that the main drive shaft 6 abuts against the center of the cutting disk 13, in order to support this cutting disk through the center.

A covering 18 is provided for the support 9 in order to keep all dust and dirt out of the same and away from this support and the cutting disk. A hopper 19 is carried by the frame 1 and has its lower end pivoted thereto as at 20 in order to allow the hopper to be folded down away from the front of the cutting disk to permit the removal or cleaning of the same. This hopper 19 is provided with a pivoted plate 21, which is normally held in the forward position indicated in Fig. 2 by means of the plunger 22 held outward by means of the spring 23. The purpose of this plate 21 is to direct the food against the cutting edges or grinding edges of the disk 13.

The movement of the plate 21 in an outward direction is limited by means of the pin 24 and this plate is normally held a slight distance away from the plate 13 as is also true of the lower edge of the hopper 19, as indicated in Fig. 2, and for the purpose of preventing any of the food from dropping between the lower edge of this hopper and the cutting disk, before it is properly cut or ground up, a baffle plate 25 projects up immediately in front of the lower edge of the hopper 19 as indicated in Figs. 1 and 2.

After the food has passed through the cutting disk 13, it falls through the openings 10 in the support 9 and drops through an opening 26 into a suitable drawer or receptacle 27 from where it may be removed for use.

Figure 5:
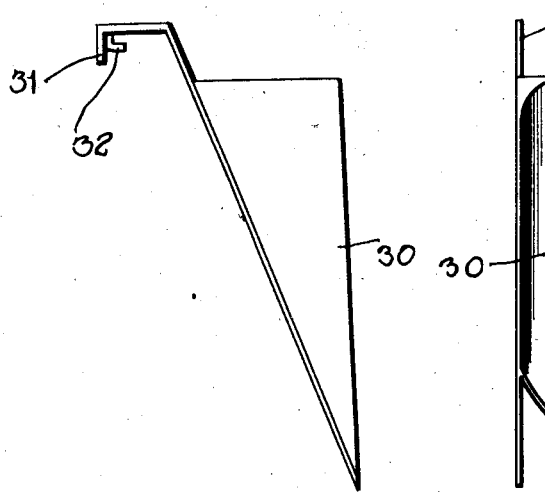
Fig. 5 is a side elevation of the delivery chutes.
Figure 6:
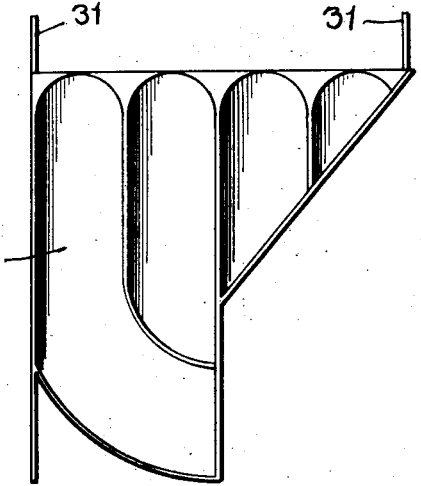
Fig. 6 is a front view of the same.

The hopper 19 is provided with a pivoted cover 28, which may be held in an adjusted open position by means of a handle 29. In order to direct the food, especially where it is of a large nature, such as potatoes, into the cutting knives, a plurality of chutes 30 are provided as shown in Figs. 5 and 6. These chutes 30 are made with their lower ends turned laterally and they are made substantially V-shaped as shown in Fig. 5, while at the same time being concave through another cross section. The chutes 30 are supported by hangers 31 over the upper edge of the hopper and, in order to limit the downward movement of the chutes into the hopper, small lugs 32 are formed on the hangers 31.

The outer end of the main drive shaft 6 is provided with a squared portion 33 upon which is mounted a potato peeler 34, which is made of a plurality of spirally shaped knives. Also, mounted upon this outer end of the shaft 6 is a whetstone 35 and a grater 36, intended to remove the rind from cheese, or it might be used for any other purpose desired. A suitable receptacle or drawer is provided below the potato peeler, whetstone and grater in order to receive the scrapings therefrom, and this drawer 37 is provided with a door 38 at the rear end thereof, which may be opened to allow the drawer to slide outward.

As shown in Fig. 1, there are two of these independent food cutters made into a single machine, the one shown on the right with the cutting disk 13 being intended especially for grinding cheese, whereas, the one on the left provided with the cutting disk 39 is intended more especially for slicing food, potatoes, or other similar objects. In order to provide this slicing operation, the cutting disk 39 is provided with a plurality of knives 40 formed thereon, as shown in Fig. 1. The movement and support for the cutting disk 39 is the same as that heretofore described for the cutting disk 13, both of these being driven from the motor 3 by means of the main gears 5 meshing with intermediate idler gears 41.

In the operation of the machine, the food is fed down through the hopper 19 either with or without the chutes 30, where it is pressed against the cutting disks 13 or 39 for grinding or slicing the same and, after such operation, the food passes through these disks into the dish-shaped support 9, from where it drops through the openings 10 in the walls thereof and through the opening 26, into the drawers 27 in the bottom of the machine from where it may be removed. The driving of these supports 9 and cutting disks is obvious from the foregoing description, they being driven through the driving gears 5, idler gears 41, from the motor 3, and its pinion 4.

I claim:

1. In a machine of the character described, the combination of a drive shaft, means for driving said shaft, a dish-shaped support mounted on said shaft adjacent the end thereof, said dish-shaped support having a plurality of openings in the periphery thereof, pins extending outwardly from said support, a cutting disk having a flange formed on the periphery thereof, said flange having a plurality of notches formed therein to receive the pins formed on the support for detachably connecting said disk to said support, said cutting disk having cutting surfaces thereon, the center of said cutting disk abutting against and being pressed by the end of said drive shaft, and a feed hopper for feeding articles to be cut to said cutting disk.

2. In a machine of the character described, the combination of a drive shaft, a dish-shaped support fixed upon said drive shaft apart from the end thereof and having a plurality of openings in the periphery thereof, a cutting disk adjustably mounted on said dish-shaped support and having cutting surfaces thereon, said disk abutting against the drive shaft, a feed hopper for feeding articles to said cutting disk.

In testimony whereof I affix my signature.

SECONDO FREILINO.